US009727791B2

(12) United States Patent
Honda (10) Patent No.: US 9,727,791 B2
(45) Date of Patent: Aug. 8, 2017

(54) PERSON DETECTION SYSTEM, METHOD, AND NON-TRANSITORY COMPUTER READABLE MEDIUM

(71) Applicant: AZBIL CORPORATION, Chiyoda-ku (JP)

(72) Inventor: Mitsuhiro Honda, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 41 days.

(21) Appl. No.: 14/919,309

(22) Filed: Oct. 21, 2015

(65) Prior Publication Data
US 2016/0110614 A1 Apr. 21, 2016

(30) Foreign Application Priority Data

Oct. 21, 2014 (JP) ................................. 2014-214378

(51) Int. Cl.
*G06K 9/00* (2006.01)
(52) U.S. Cl.
CPC ..... *G06K 9/00778* (2013.01); *G06K 9/00369* (2013.01); *G06K 9/00295* (2013.01)
(58) Field of Classification Search
CPC .......... G06K 9/00778; G06K 9/00295; G06K 9/00369; G06K 9/6202; G06K 9/00624; G06K 9/6215; G06K 9/2018; G06K 9/00771; G06K 9/00362; G06K 9/3241; G06T 2207/30212; G06T 2207/30232; G06T 2207/30242; G06T 2207/30196;
(Continued)

(56) References Cited

U.S. PATENT DOCUMENTS

| 5,555,512 | A | * | 9/1996 | Imai | G06K 9/00369 250/342 |
|---|---|---|---|---|---|
| 2012/0310417 | A1 | * | 12/2012 | Enohara | F24F 11/0034 700/276 |
| 2015/0009332 | A1 | * | 1/2015 | Fuhrmann | G08B 21/22 348/155 |
| 2015/0136378 | A1 | * | 5/2015 | Maeda | F24F 11/0034 165/237 |
| 2015/0247647 | A1 | * | 9/2015 | Kusukame | F24F 11/006 700/276 |

(Continued)

FOREIGN PATENT DOCUMENTS

| JP | H11-311682 | 11/1999 |
|---|---|---|
| JP | 2008-112257 | 5/2008 |

(Continued)

OTHER PUBLICATIONS

Andersson, Maria et al. , "Estimation of Crowd Behavior Using Sensor Networks and Sensor Fusion", Jul. 6-9, 2009, 12th International Conference on Information Fusion.*

(Continued)

*Primary Examiner* — Jose Couso
(74) *Attorney, Agent, or Firm* — Oblon, McClelland, Maier & Neustadt, L.L.P.

(57) ABSTRACT

A system for distinguishing a first group of persons from a second group of persons among plural persons who are present inside an area, and the system includes processing circuitry that: detects first positions of the plural persons who are present inside the area based on a heat image; detects second positions of the second group of persons who are present inside the area based on identification signals transmitted from portable wireless terminals of the second group of persons; and determines, as the first group of persons, those who are present at positions different from the second positions based on the first and second positions.

17 Claims, 8 Drawing Sheets

(58) Field of Classification Search
CPC .... G06T 7/00; G06T 7/20; G06T 7/70; H04N 7/18; H04N 7/181; H04N 5/23219; H04N 5/23229; H04N 5/23245; H04N 5/33; H04N 5/332; G08B 13/00; G08B 13/19–13/19615; G08B 13/19645; G08B 19/647; G08B 19/19652; G08B 19/673; G08B 19/1968; G08B 19/19696; G08B 21/22; B66B 1/3476; B66B 5/0006; B66B 5/0031; G07C 9/00; Y10S 25/01; F24F 11/00; F24F 11/0012; F24F 11/0034; F24F 2011/0035; F24F 2011/0036; F24F 2011/0068; B60R 21/01534; B60R 21/01538; G01S 17/00; G01S 17/023; G01S 17/026; G01S 17/06; G01S 17/89

See application file for complete search history.

(56) References Cited

U.S. PATENT DOCUMENTS

2016/0320085 A1* 11/2016 Silawan .................. F24F 11/02

FOREIGN PATENT DOCUMENTS

| JP | 2008-198077 | 8/2008 |
| JP | 2012-37408 | 2/2012 |
| JP | 2014-75755 | 4/2014 |

OTHER PUBLICATIONS

Office Action issued Oct. 21, 2016 in Korean Patent Application No. 10-2015-0144638 (with English-machine translation).

* cited by examiner

PERSON DETECTION SYSTEM, METHOD, AND NON-TRANSITORY COMPUTER READABLE MEDIUM

CROSS-REFERENCE TO RELATED APPLICATIONS

This application claims priority to Japanese Application No. 2014-214378, filed Oct. 21, 2014, the entire contents of which are incorporated herein by reference.

FIELD

The present disclosure relates to a person detection technique. More particularly, the disclosure relates to a person detection technique for making detection while distinguishing persons concerned from outsiders among plural persons who are present inside an area.

BACKGROUND

As a person detection technique for detecting the position(s) of a person(s) who is present inside an area, a technique of detecting the position of a person from an image captured by using a camera has been proposed in Japanese Unexamined Patent Application Publication No. 11-311682. In this method, the position of a person is detected by comparing an image captured by using a camera with a background image that has been prepared in advance. In a known method of this kind, a heat image captured by using an infrared camera is used, and the image is compared with a background temperature, thereby detecting the position of a person.

On another front, a technique of detecting the position of a person(s) who is the target of detection on the basis of a signal transmitted from a portable wireless terminal that has an RFID or GPS function, etc. and is carried by the target person, without using any image, has been proposed in Japanese Unexamined Patent Application Publication No. 2008-112257. In a known method of this kind, the position of a person is detected on the basis of the intensity of a signal (radio wave) transmitted from a wireless terminal. In another known method of this kind, a wireless terminal notifies its own GPS-detected position by means of a signal.

SUMMARY

According to one aspect of the disclosure, there is provided a system for distinguishing a first group of persons from a second group of persons among plural persons who are present inside an area, and the system includes processing circuitry that: detects first positions of the plural persons who are present inside the area based on a heat image; detects second positions of the second group of persons who are present inside the area based on identification signals transmitted from portable wireless terminals of the second group of persons; and determines, as the first group of persons, those who are present at positions different from the second positions based on the first and second positions.

DETAILED DESCRIPTION

When the positions of persons who are present inside an area, and the flow of them, are analyzed, in some cases, the analyzer wants to make detection while distinguishing persons concerned from outsiders. For example, when the positions of persons who are present inside an area such as an exhibition site or a store, etc. are detected for analyzing a location more crowded with visitors or customers, or for analyzing flow routes, because of the presence of persons concerned such as host/exhibitor staff or salesclerks in the area in addition to the visitors or the customers, it is difficult to obtain a good analysis result with high precision due to analysis noise, that is, the persons concerned. When workers who are in an office are monitored for office security, it is necessary to distinguish employees from others.

In the above-mentioned technique disclosed in Japanese Unexamined Patent Application Publication No. 11-311682, since the position of a person is detected from an image captured by using a camera, it is not necessary to ask the target person to carry any portable wireless terminal. Therefore, though it is possible to detect the position of a person who is present inside an area easily, it is not possible to distinguish whether the position-detected person is a person concerned or an outsider.

On the other hand, in the above-mentioned technique disclosed in Japanese Unexamined Patent Application Publication No. 2008-112257, since it is easy to identify a portable wireless terminal carried by a person who is the target of detection, it is possible to distinguish whether the position-detected person is a person concerned or an outsider. However, it is necessary to ask all of the target persons to carry portable wireless terminals. Therefore, when the system is used in area that attracts a lot of people such as an exhibition site or a large store, etc., it is difficult to force all of visitors or customers to carry portable wireless terminals. In addition, wireless terminal management cost increases. Therefore, it is not possible to make detection easily.

The present disclosure has been made in order to solve the problems described above. An object of the disclosure is to provide a person detection technique with which it is possible to make detection while distinguishing, for each of persons who are present inside an area, whether said person is a person concerned or an outsider accurately and easily.

To achieve the object described above, a person detection system according to the present disclosure, which is a system for making detection while distinguishing persons concerned from outsiders among plural persons who are present inside an area, comprises: a person detection unit that detects positions of the persons who are present inside the area on the basis of a heat image obtained by capturing the area; a person-concerned detection unit that detects positions of the persons concerned who are present inside the area on the basis of identification signals transmitted from portable wireless terminals of the persons concerned; and an outsider judgment unit that judges, as the outsiders who are present inside the area among the persons detected by the person detection unit, those who are present at positions different from the positions of the persons concerned detected by the person-concerned detection unit.

In one structure example of the above person detection system according to the present disclosure, on the basis of the positions of the persons and the positions of the persons concerned, the outsider judgment unit calculates a detection error distance between the two each, compares the detection error distance with a tolerable error distance each, and judges whether each person in question is the person concerned or the outsider on the basis of a comparison result.

In one structure example of the above person detection system according to the present disclosure, when the detection error distance is compared with the tolerable error distance, the outsider judgment unit compares, with the tolerable error distance, an average detection error distance obtained by averaging the detection error distances between the two over a predetermined distance judgment time period.

In one structure example of the above person detection system according to the present disclosure, the person detection unit detects the positions of the persons by calculating a background temperature of a background where no person is present by performing statistical processing of pixel temperature of each of pixels included in the heat image, and by comparing a difference between each pixel temperature and the background temperature with a reference temperature difference.

In one structure example of the above person detection system according to the present disclosure, the person detection unit detects the positions of the persons by calculating, for each of the pixels, a difference in pixel temperature between the heat image and a background heat image that is a previous heat image that was obtained predetermined background selection time ago, and by comparing the difference with a reference temperature difference.

In one structure example, the above person detection system further comprises: a detection result output unit for screen display of at least the positions of the outsiders judged as being present inside the area by the outsider judgment unit on the basis of the positions of the persons detected by the person detection unit.

A person detection method according to the present disclosure, which is a method for making detection while distinguishing persons concerned from outsiders among plural persons who are present inside an area, comprises: a person detection step of detecting positions of the persons who are present inside the area on the basis of a heat image obtained by capturing the area; a person-concerned detection step of detecting positions of the persons concerned who are present inside the area on the basis of identification signals transmitted from portable wireless terminals of the persons concerned; and an outsider judgment step of judging, as the outsiders who are present inside the area among the persons detected in the person detection step, those who are present at positions different from the positions of the persons concerned detected in the person-concerned detection step.

With the present disclosure, the positions of the outsiders who are present inside the area are detected not directly but indirectly on the basis of the persons who are present inside the area and the persons concerned who are present inside the area. Those who have to carry wireless terminals are the persons concerned only. Therefore, for each of persons who are present inside an area, it is possible to judge whether said each person in question is the person concerned or the outsider accurately and easily without any need for asking all of visitors or customers to carry wireless terminals.

First, the principle of the present disclosure will now be explained.

It is possible to find the positions of a persons who are present inside an area by using heat images obtained by capturing the area by infrared image sensors as positions whose temperature is higher than temperature therearound, that is, on the basis of heat-producing-body positions. However, the heat image alone is insufficient for judging whether each person in question is a person concerned or an outsider.

If everyone present inside an area carries a portable wireless terminal having an RFID or GPS function, etc., and if an identification signal is received from each of the wireless terminals, it is not only possible to acquire person position information but also possible to distinguish persons concerned from outsiders easily. However, in an area that is accessible to many and unspecified persons, for example, an exhibition site or a store, it is difficult to ask all of visitors or customers to carry portable wireless terminals.

Some reasons why it is difficult to ask outsiders such as visitors or customers to carry portable wireless terminals are: the burden of rental wireless terminal management is heavy because of a large number of them; some visitors or customers might refuse; if there is anyone who gets into the area fraudulently not through the entrance, there is no way of asking him/her to carry such a wireless terminal.

Among persons who are present inside an area, the number of persons concerned is smaller than outsiders. Moreover, no person concerned refuses, and it is practically possible to have every person concerned carry it. These overcome all of the above-described difficulties regarding the carrying of portable wireless terminals by outsiders.

With a focus on the differences between persons concerned and outsiders regarding the carrying of portable wireless terminals, in the present disclosure, not outsiders but persons concerned carry portable wireless terminals; the positions of the persons concerned are detected on the basis of identification signals sent from the wireless terminals; then, comparison processing is performed for the positions of persons including both the outsiders and the persons concerned detected out of a heat image, thereby judging those other than the persons concerned as the outsiders among the persons detected out of the heat image.

Next, with reference to the drawings, an exemplary embodiment of the present disclosure is explained below.

Figure 1:
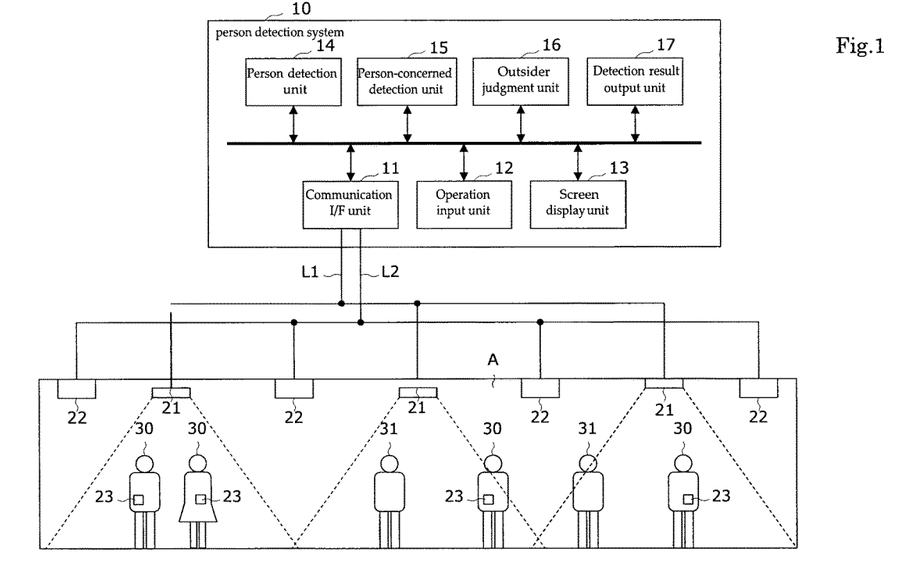
FIG. 1 is a block diagram that illustrates the structure of a detection system.

First, with reference to FIG. 1, a person detection system 10 according to an exemplary embodiment of the present disclosure will now be explained. FIG. 1 is a block diagram that illustrates the structure of a detection system.

The person detection system 10 as a whole is made up of plural servers, or a single server, and has a function of making detection while distinguishing persons concerned 30 from outsiders 31 among plural persons who are present inside an area A.

Infrared image sensors 21 using infrared sensing elements such as thermopile elements are installed on the ceiling and walls of the detection target area A. Heat images containing the persons concerned 30 and the outsiders 31 present inside the area A are captured by the infrared image sensors 21. The captured images are sent to the person detection system 10 via a communication channel L1.

Wireless devices 22 are installed on the ceiling and walls of the area A. Signals transmitted from wireless terminals 23 carried by the persons concerned 30 (or worn on the body of the persons concerned 30) are sent to the person detection system 10 via a communication channel L2.

Next, with reference to FIG. 1, the structure of the person detection system 10 according to the present embodiment will now be explained in detail.

The person detection system 10 includes, as its major functional units, a communication I/F unit 11, an operation input unit 12, a screen display unit 13, a person detection unit 14, a person-concerned detection unit 15, an outsider judgment unit 16, and a detection result output unit 17.

The communication I/F unit 11 has a function of receiving the heat images captured by the infrared image sensors 21 by performing data communication with the infrared image sensors 21 via the communication channel L1, and a function of receiving the signals transmitted from the wireless terminals 23 by performing wireless data communication with the wireless devices 22 via the communication channel L2.

The operation input unit 12 is an operation input device such as a keyboard, a mouse, or a touch panel, and has a function of detecting operation performed by an operator and outputting it to each functional unit.

The screen display unit 13 is a screen display device such as an LCD, and has a function of displaying various kinds of data outputted from each functional unit, for example, an operation screen and a detection result screen.

The person detection unit 14 has a function of detecting the positions of persons who are present inside the area A on the basis of the heat images acquired from the infrared image sensors 21 via the communication I/F unit 11.

Figure 2:
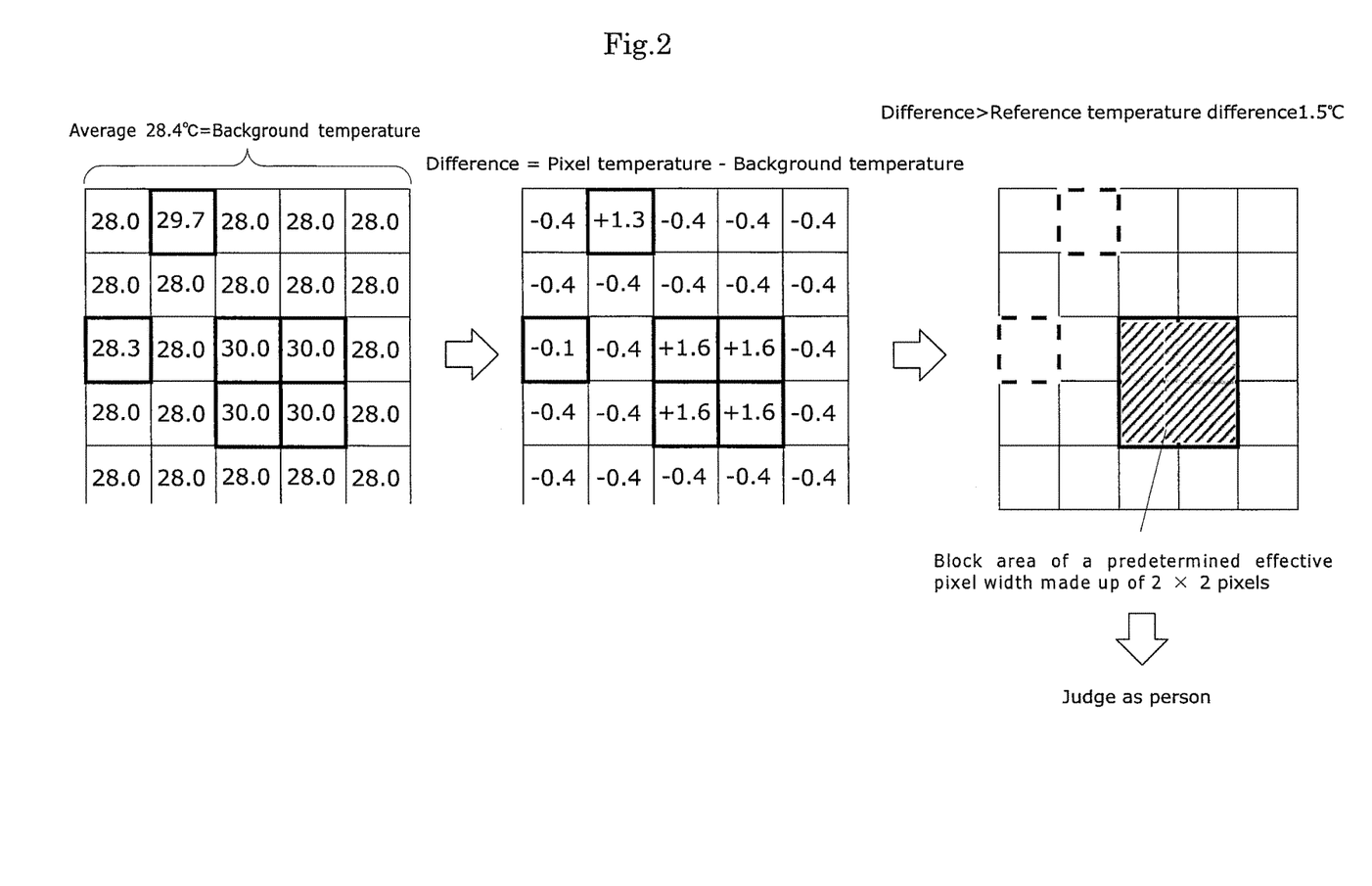
FIG. 2 is a diagram for explaining a person detection method.

FIG. 2 is a diagram for explaining a person detection method. In this drawing, a heat image captured by a single infrared image sensor 21 and made up of 5×5 pixels is illustrated. Person position detection may be performed for a heat image captured by each infrared image sensor 21. Alternatively, person position detection may be performed for a merged heat image of the entire area A, which is obtained by merging the heat images into one.

First, a background temperature regarding a background area where no person is present, for example, the floor and a desk, is calculated by performing statistical processing of the pixel temperature (pixel value) of each of the pixels that make up the heat image. In this example, a background temperature of 28.4° C. is calculated from the average of the values of the pixel temperature. Instead of the average value, a representative value that represents all of the pixels that make up the heat image, for example, the median or the mode in histogram, may be used.

Next, the difference between each pixel temperature and the background temperature is calculated, and the difference is compared each with a reference temperature difference. Pixels at which the difference is greater than the reference temperature difference are found. If the found pixels constitute a "group-of-adjacent-pixels" block area whose block width is not less than a predetermined effective pixel width, the position is detected as the position of a person(s). By this means, it is possible to suppress the effect of noise less than the effective pixel width.

In the example of FIG. 2, the found pixels, at which the difference is greater than the reference temperature difference, constitute a block area of a predetermined effective pixel width made up of 2×2 pixels. Therefore, the center position of these found pixels is detected as the position of a person. The predetermined effective pixel width can be preset on the basis of a relationship between heat-image resolution and person size.

Figure 3:
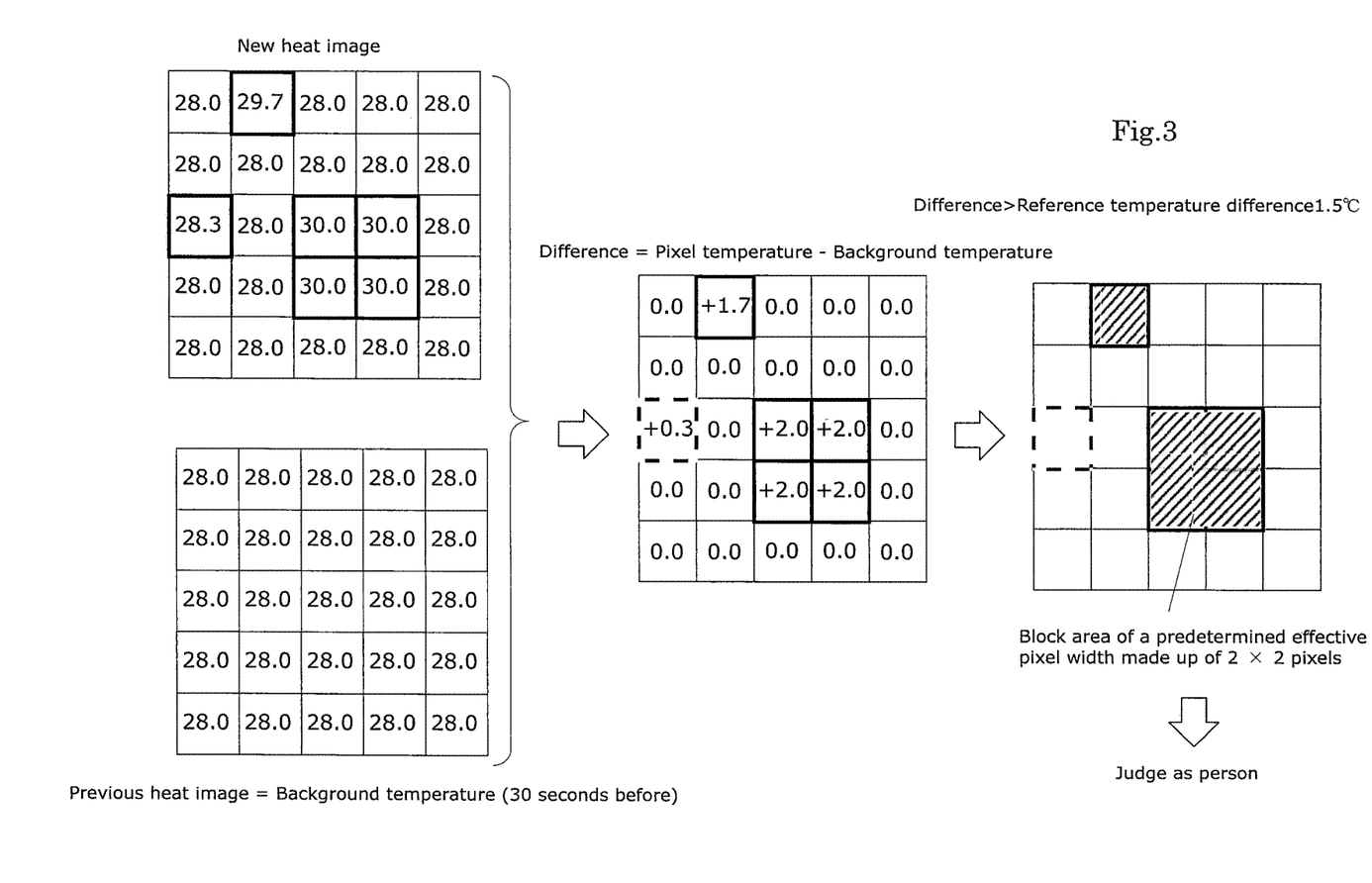
FIG. 3 is a diagram for explaining another method for person detection.

FIG. 3 is a diagram for explaining another method for person detection. In the method explained with reference to FIG. 2, the position of a person is detected on the basis of the difference from the background temperature obtained by performing statistical processing. In the method explained below, the position of a person is detected on the basis of the difference from the pixel temperature of a background heat image that is a previous heat image.

In FIG. 3, first, for each of the pixels, the difference in pixel temperature between a new heat image and a background heat image that is a previous heat image that was obtained predetermined background selection time ago is calculated, and the difference is compared with a reference temperature difference. After that, pixels at which the difference is greater than the reference temperature difference are found. If the found pixels constitute a block area whose block width is not less than a predetermined effective pixel width, the position is detected as the position of a person(s).

As in the foregoing example, the found pixels, at which the difference is greater than the reference temperature difference, constitute a block area of a predetermined effective pixel width made up of 2×2 pixels. Therefore, the center position of these found pixels is detected as the position of a person.

The person-concerned detection unit 15 has a function of detecting the positions of the persons concerned 30 who are present inside the area A on the basis of identification signals from the wireless terminals 23. These identification signals are acquired from the wireless devices 22 via the communication I/F unit 11. A known method can be used as the method for detecting the position of a person on the basis of the identification signal. Examples are: a method of detecting the position of a person on the basis of the intensity of an identification signal (radio wave or ultrasonic wave) transmitted from the wireless terminal 23, and a method of notifying the own position detected by using the built-in GPS function of the wireless terminal 23 by means of an identification signal.

The outsider judgment unit 16 has a function of judging, as the outsiders 31 among the persons detected by the person detection unit 14, those who are present at positions different from the positions of the persons concerned 30 detected by the person-concerned detection unit 15.

The following method can be used for judging the outsiders 31: a detection error distance between the two is calculated for every combination of the persons and the persons concerned 30; if the detection error distance is not longer than a tolerable error distance, the person is judged as the person concerned 30; if not, the person is judged as the outsider 31.

The detection result output unit 17 has a function of generating a detection result output screen for display on the screen display unit 13 on the basis of the positions of the persons detected by the person detection unit 14, wherein, at least, the detection result output screen shows the positions of the outsiders 31 judged as being present inside the area A by the outsider judgment unit 16. On the detection result output screen, both the positions of the outsiders 31 and the positions of the persons concerned 30 detected by the person-concerned detection unit 15 may be displayed. If the presence or absence of any outsider 31 is important, instead of displaying the position(s) of the outsider(s) 31, the presence or absence of any outsider 31 or the number of the outsiders 31 may be displayed on the screen.

Among the functional units described above, the person detection unit 14, the person-concerned detection unit 15, the outsider judgment unit 16, and the detection result output unit 17 are embodied as an arithmetic processing unit that implements various processing modules by running a program read out of a memory unit by a CPU. The CPU is an example of processing circuitry.

Figure 4:
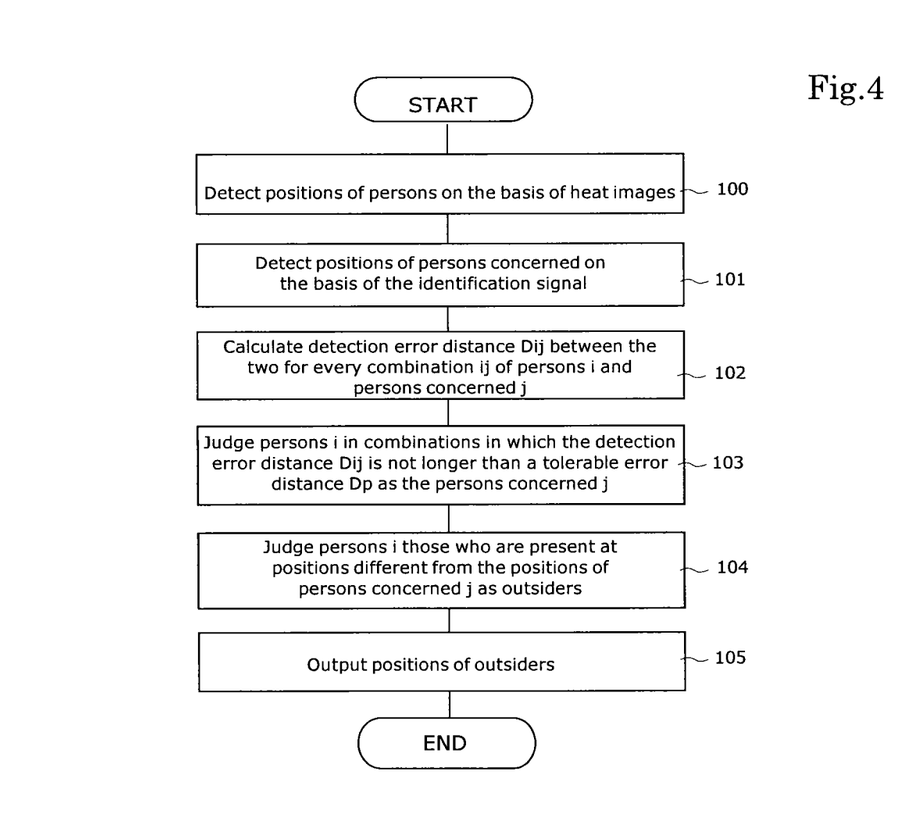
FIG. 4 is a flowchart that illustrates person detection processing.

Next, with reference to FIG. 4, the operation of the person detection system 10 according to the present embodiment will now be explained. FIG. 4 is a flowchart that illustrates person detection processing.

First, the person detection unit 14 acquires a heat image from each of the infrared image sensors 21 via the communication I/F unit 11, and detects the positions of persons who are present inside the area A on the basis of these heat images by using the person position detection method explained earlier with reference to FIG. 2 or 3 (Step 100).

Figure 5:
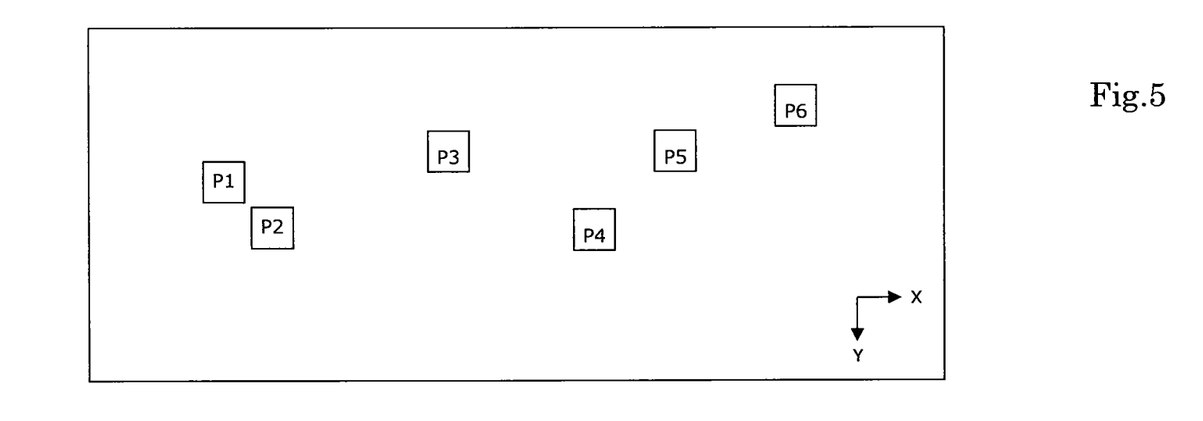
FIG. 5 is a diagram of an example of the detection of the positions of persons on the basis of heat images.

An example of the detection of the positions of persons on the basis of heat images is illustrated in FIG. 5. In this example, six persons in total, P1 to P6, are detected inside the area A.

Next, the person-concerned detection unit 15 acquires identification signals from the wireless terminals 23 via the communication I/F unit 11, and detects the positions of the persons concerned 31 present inside the area A on the basis of the identification signals by using the aforementioned known method, for example, a method of detecting the position of a person on the basis of the intensity of an identification signal (radio wave or ultrasonic wave) transmitted from the wireless terminal 23 or a method of notifying the own position detected by using the built-in GPS function of the wireless terminal 23 by means of an identification signal (Step 101).

Figure 6:
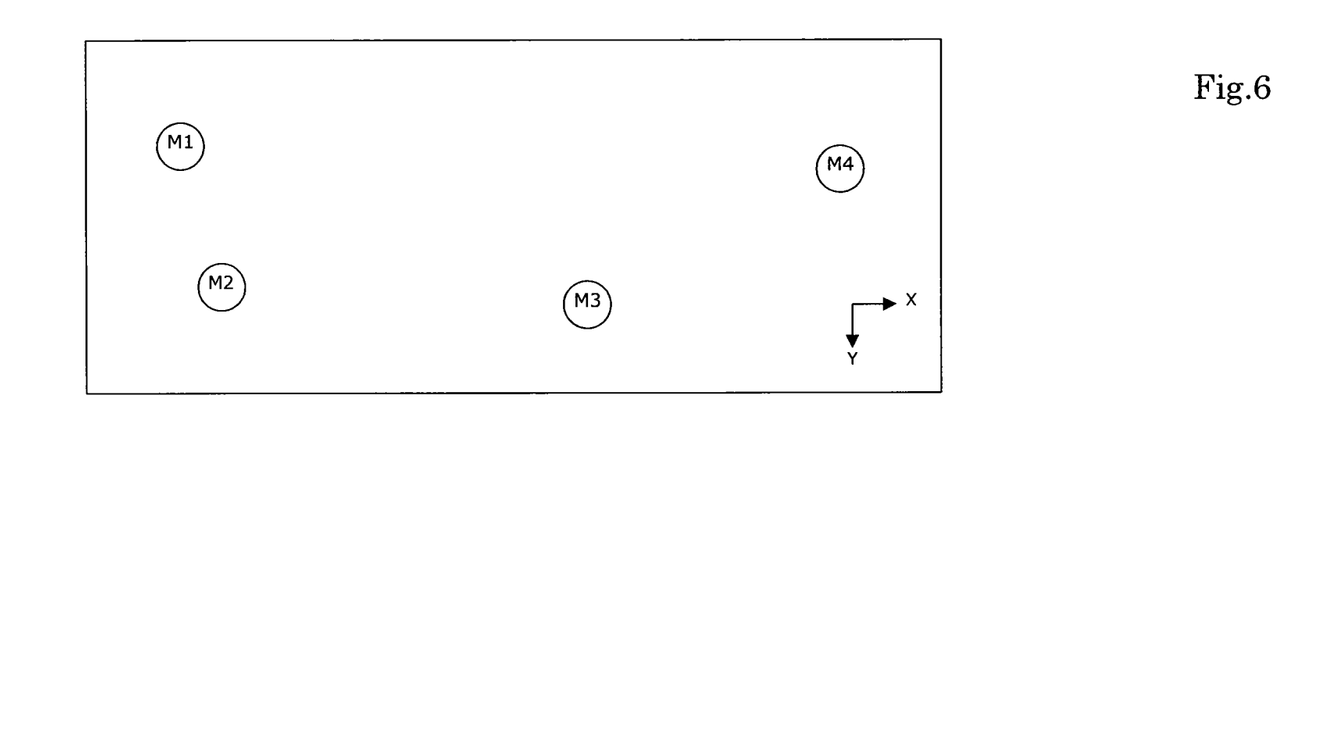
FIG. 6 is a diagram of an example of detection of the positions of persons on the basis of identification signals.

An example of detection of the positions of persons on the basis of identification signals is illustrated in FIG. 6. In this example, four persons concerned 30, M1 to M4, are detected inside the area A.

Next, the outsider judgment unit 16 calculates a detection error distance Dij between the two for every combination ij of the persons i detected by the person detection unit 14 and the persons concerned j detected by the person-concerned detection unit 15 (Step 102). Among these combinations, persons in combinations in which the detection error distance Dij is not longer than a tolerable error distance Dp are judged as the persons concerned 30 (Step 103). In this process, if, for the same person, there are plural persons concerned 30 who satisfy the above condition that the detection error distance Dij is not longer than the tolerable error distance Dp, the person concerned 30 with the shortest distance Dij is selected. Among the persons detected by the person detection unit 14, those who are not judged as the persons concerned 30 are judged as the outsiders 31 (Step 104).

Because of the difference in detection method and the difference in equipment used, a detection error between the detection results of the person detection unit 14 and the detection results of the person-concerned detection unit 15 is inevitable to some extent. The error appears in the form of discrepancy in detected position. In view of this, on the basis of the preset tolerable error distance Dp based on the detection error, it is judged whether the detection results of the two relate to the same person or not.

Let XTi, YTi be the coordinates of the person i. Let XRj, YRj be the coordinates of the person concerned j. Given these definitions, the detection error distance Dij between the two can be calculated using the following Formula (1).

$$Dij = \sqrt{(XTi - XRj)^2 + (YTi - YRj)^2} \quad (1)$$

Figure 7:
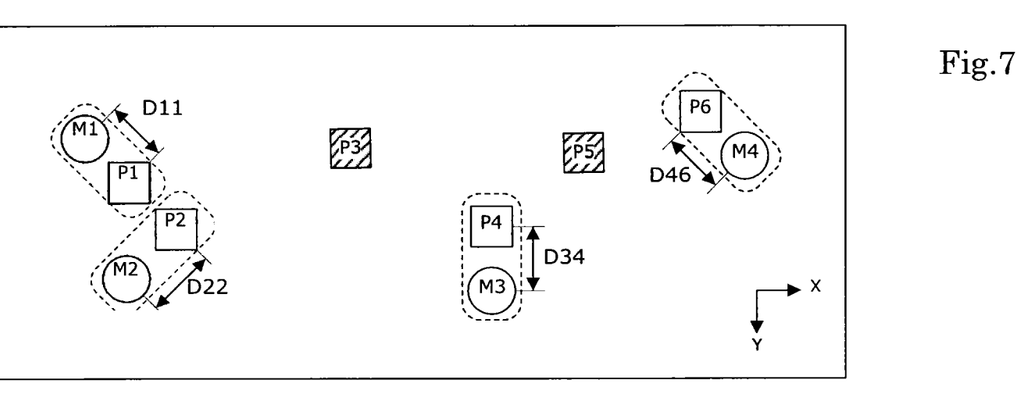
FIG. 7 is a diagram of an example of calculation of detection error distances.

An example of calculation of detection error distances is illustrated in FIG. 7. In this example, each of the following distances is not longer than the tolerable error distance Dp: the detection error distance D11 between the person P1 and the person concerned M1, the detection error distance D22 between the person P2 and the person concerned M2, the detection error distance D43 between the person P4 and the person concerned M3, and the detection error distance D64 between the person P6 and the person concerned M4. For this reason, it is judged that the persons P1, P2, P4, and P6 are identical with the persons concerned M1, M2, M3, and M4 respectively. Regarding the persons other than P1, P2, P4, and P6, that is, the persons P3 and P5, there is no person concerned 30 for whom the detection error distance Dij is not longer than the tolerable error distance Dp. Therefore, the persons P3 and P5 are judged as the outsiders 31.

In this way, the outsider judgment unit 16 judges, as the outsiders 31 present inside the area A among the persons detected by the person detection unit 14, those who are present at positions different from the positions of the persons concerned 30 detected by the person-concerned detection unit 15.

After that, the detection result output unit 17 generates a detection result output screen that shows the positions of the persons concerned 30 and/or the positions of the outsiders 31 present inside the area A, and displays it on the screen display unit 13 (Step 105) to end a series of the person detection processing.

Figure 8:
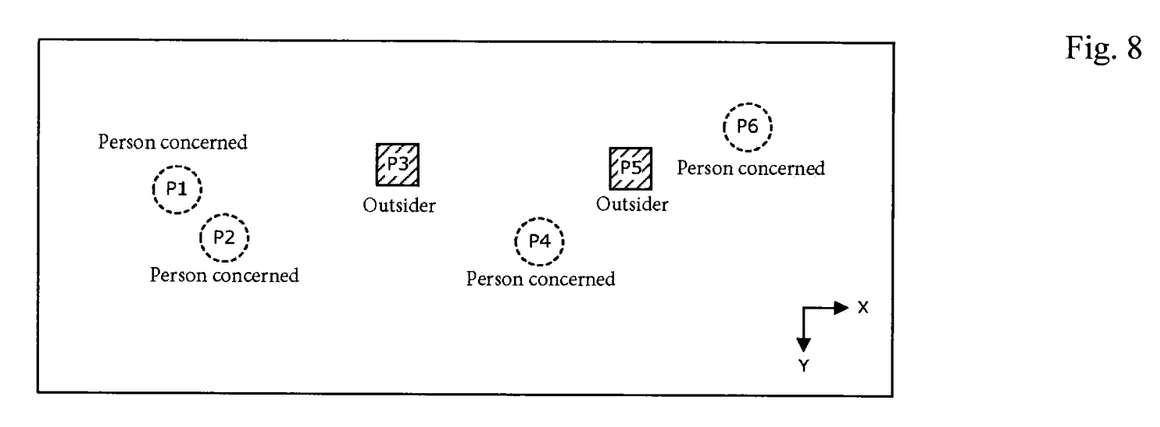
FIG. 8 is a diagram of an example of display of a detection result output screen.

An example of display of a detection result output screen is illustrated in FIG. 8. In this example, circles, each of which is the symbol of the person concerned 30, are displayed at the positions of the persons P1, P2, P4, and P6 judged as the persons concerned 30 in FIG. 7, and squares (hatching), each of which is the symbol of the outsider 31, are displayed at the positions of the persons P3 and P5 judged as the outsiders 31 in FIG. 7. A popular method can be used for identifiable display of the persons concerned 30 and the outsiders 31. If the positions of the outsiders 31 are important, the display of the persons concerned 30 may be omitted.

It is said that the precision of detection by the person-concerned detection unit 15, that is, detection by using a method of detecting the position of a person on the basis of the intensity of an identification signal transmitted from the wireless terminal 23 or a method of notifying the own position detected by using the built-in GPS function of the wireless terminal 23 by means of an identification signal, is lower than the detection precision of person detection by the person detection unit 14, if the two are compared with each other on the basis of a popular and realistic structure that is available in the current state of art. Therefore, in the outsider judgment unit 16, when the positions of the persons concerned 30 are determined, it suffices to generate a detection result output screen by using the coordinates of the persons detected by the person detection unit 14.

With the above-mentioned detection precision taken into consideration, in the outsider judgment unit 16, when the detection error distance Dij is compared with the tolerable error distance Dp, an average detection error distance Dijm, which is obtained by averaging the detection error distances Dij between the two over a predetermined distance judgment time period, may be compared with the tolerable error distance Dp. By this means, it is possible to reduce a detection error contained in the positions of the persons concerned 30 detected by the person-concerned detection unit 15, resulting in a reliable person-concerned judgment.

As described above, in the present embodiment, the person detection unit 14 detects the positions of persons who are present inside the area A on the basis of a heat image(s) obtained by capturing the area A. The person-concerned detection unit 15 detects the positions of the persons concerned 30 who are present inside the area A on the basis of identification signals transmitted from the portable wireless terminals 23 of the persons concerned 30. The outsider judgment unit 16 judges, as the outsiders 31 who are present inside the area A among the persons detected by the person detection unit 14, those who are present at positions different from the positions of the persons concerned 30 detected by the person-concerned detection unit 15.

Therefore, the positions of the outsiders 31 who are present inside the area A are detected not directly but indirectly on the basis of the persons who are present inside the area A and the persons concerned 30 who are present inside the area A. Those who have to carry the wireless terminals 23 are the persons concerned 30 only. Therefore, it is possible to make detection while distinguishing the persons concerned 30 from the outsiders 31 among plural persons who are present inside the area A accurately and easily without any need for asking all of visitors or customers to carry the wireless terminals 23.

In the present embodiment, on the basis of the positions of the persons and the positions of the persons concerned 30, the outsider judgment unit 16 may calculate the detection error distance Dij between the two each, may compare the detection error distance Dij with the tolerable error distance Dp each, and may judge whether each person in question is the person concerned 30 or the outsider 31 on the basis of a comparison result. Therefore, it is possible to judge the persons concerned 30 accurately from among the plural persons who are present inside the area A even if there is some detection error between the detected positions of the persons and the detected positions of the persons concerned 30.

Moreover, in the outsider judgment unit 16, when the detection error distance Dij is compared with the tolerable error distance Dp, an average detection error distance Dijm, which is obtained by averaging the detection error distances Dij between the two over a predetermined distance judgment time period, may be compared with the tolerable error distance Dp. Therefore, it is possible to judge the persons concerned 30 accurately from among the plural persons who are present inside the area A even if the person-concerned positions contain some detection error.

In the present embodiment, the person detection unit 14 may detect the positions of the persons by calculating a background temperature of a background where no person is present by performing statistical processing of pixel temperature of each of pixels included in the heat image, and by comparing a difference between each pixel temperature and the background temperature with a reference temperature difference. By this means, it is possible to detect the positions of the persons with high precision with comparatively simple calculation processing on the basis of the obtained heat image only.

In the present embodiment, the person detection unit 14 may detect the positions of the persons by calculating, for each of the pixels, a difference in pixel temperature between the heat image and a background heat image that is a previous heat image that was obtained predetermined background selection time ago, and by comparing the difference with a reference temperature difference. By this means, even if there is a fixed object that generates heat inside the area A, it is possible to detect only a heat-producing body that moves, for example, human, with high precision. There is a possibility that a fixed heat-generating object that exists inside an area A cannot be distinguished from a person in a case where the position of the person is detected on the basis of the background temperature obtained by performing statistical processing. However, even in such a case, if the position of the fixed heat-generating object is preset, it is possible to distinguish it from a person.

Though the present disclosure is explained above by means of an exemplary embodiment, the disclosure is not limited to the above embodiment. The structure and details of the disclosure can be modified in various manners that can be apprehended by those skilled in the art, within the scope of the disclosure. The embodiments may be combined arbitrarily as long as they are not contradictory.

The invention claimed is:

1. A system for distinguishing a first group of persons from a second group of persons among plural persons who are present inside an area, the system comprising:
    processing circuitry configured to
        detect first positions of the plural persons who are present inside the area based on a heat image;
        detect second positions of the second group of persons who are present inside the area based on identification signals transmitted from portable wireless terminals of the second group of persons; and
        determine, as the first group of persons, those persons who are present at positions different from the second positions of the second group of persons, based on the first and second positions, wherein
    based on the first and second positions, the processing circuitry calculates a detection error distance between each of the first and second positions, compares each detection error distance with a tolerable error distance, and determines, for each person of the plural persons who are present inside the area, whether the person belongs to the first group of persons or the second group of persons based on a comparison result.

2. The system according to claim 1, wherein, the processing circuitry calculates the detection error distance as an average detection error distance obtained by averaging the detection error distances over a predetermined distance judgment time period.

3. A system for distinguishing a first group of persons from a second group of persons among plural persons who are present inside an area, the system comprising
    processing circuitry configured to
        detect first positions of the plural persons who are present inside the area based on a heat image;
        detect second positions of the second group of persons who are present inside the area based on identification signals transmitted from portable wireless terminals of the second group of persons; and
        determine, as the first group of persons, those persons who are present at positions different from the second positions of the second group of persons, based on the first and second positions, wherein
    the processing circuitry detects the first positions by calculating a background temperature of a background where no person is present by performing statistical processing of each of pixel values representing temperature included in the heat image, and by comparing a difference between each of the pixel values and the background temperature with a reference temperature difference.

4. A system for distinguishing a first group of persons from a second group of persons among plural persons who are present inside an area, the system comprising:
    processing circuitry configured to
        detect first positions of the plural persons who are present inside the area based on a heat image;

detect second positions of the second group of persons who are present inside the area based on identification signals transmitted from portable wireless terminals of the second group of persons; and determine as the first group of persons those persons who are present at positions different from the second positions of the second group of persons, based on the first and second positions, wherein the processing circuitry detects the first positions by calculating, for each of pixels included in the heat image, a difference in pixel temperature between the heat image and a background heat image, which is a previous heat image that was obtained at a predetermined time, and by comparing the difference with a reference temperature difference.

5. The system according to claim 1, further comprising:
a display configured to display positions of the persons determined as the first group of persons by the processing circuitry.

6. The system according to claim 1, further comprising:
a display configured to display positions of the second group of persons based on the first positions.

7. The system according to claim 1, wherein
when there are plural persons whose detection error distance is within the tolerable error distance, the processing circuitry determines a person whose detection error distance is a shortest to be in the second group of persons.

8. The system according to claim 1, wherein the processing circuitry designates those persons in the first group of persons as outsiders.

9. The system according to claim 1, wherein the processing circuitry designates those persons in the second group of persons as persons concerned.

10. The system according to claim 1, further comprising:
an infrared image sensor to obtain the heat image.

11. The system according to claim 1, further comprising:
a wireless device to detect the identification signals transmitted from the portable wireless terminals of the second group of persons.

12. A method for distinguishing a first group of persons from a second group of persons among plural persons who are present inside an area, the method comprising:
detecting first positions of the plural persons who are present inside the area based on a heat image;
detecting second positions of the second group of persons who are present inside the area based on identification signals transmitted from portable wireless terminals of the second group of persons;
determining, using processing circuitry, as the first group of persons, those persons who are present at positions different from the second positions of the second group of persons, based on the first and second positions;
based on the first and second positions, calculating a detection error distance between each of the first and second positions;
comparing each of the detection error distance with a tolerable error distance; and,
determining, for each of the plural persons who are present inside the area, whether belonging to the first group of person or the second group of person based on a comparison result.

13. The method according to claim 12, wherein, the detection error distance to be compared with the tolerable error distance is an average detection error distance obtained by averaging the detection error distances over a predetermined distance judgment time period.

14. The method according to claim 12, further comprising:
displaying positions of persons determined as the first group of persons by the processing circuitry.

15. A non-transitory computer readable medium including executable instructions, which when executed by a computer cause the computer to execute a method for distinguishing a first group of persons from a second group of persons among plural persons who are present inside an area, the method comprising:
detecting first positions of the plural persons who are present inside the area based on a heat image;
detecting second positions of the second group of persons who are present inside the area based on identification signals transmitted from portable wireless terminals of the second group of persons;
determining, as the first group of persons, those persons who are present at positions different from the second positions of the second group of persons, based on the first and second positions;
based on the first and second positions, calculating a detection error distance between each of the first and second positions;
comparing each of the detection error distance with a tolerable error distance; and
determining, for each of the plural persons who are present inside the area, whether belonging to the first group of person or the second group of person based on a comparison result.

16. The non-transitory computer readable medium according to claim 15, wherein, the detection error distance to be compared with the tolerable error distance is an average detection error distance obtained by averaging the detection error distances over a predetermined distance judgment time period.

17. The non-transitory computer readable medium according to claim 15, the method further comprising:
displaying positions of persons determined as the first group of persons.

* * * * *